US008571748B2

(12) United States Patent
Kluge et al.

(10) Patent No.: US 8,571,748 B2
(45) Date of Patent: Oct. 29, 2013

(54) METHOD OF ESTIMATING A PROPULSION-RELATED OPERATING PARAMETER

(75) Inventors: Sebastian Kluge, Munich (DE); Alexey Pryakhin, Munich (DE); Peter Kunath, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 688 days.

(21) Appl. No.: 12/708,400

(22) Filed: Feb. 18, 2010

(65) Prior Publication Data

US 2011/0040438 A1  Feb. 17, 2011

(30) Foreign Application Priority Data

Feb. 18, 2009  (EP) .................................... 09002291

(51) Int. Cl.
*G01M 17/00* (2006.01)
(52) U.S. Cl.
USPC ................ 701/29.1; 701/22; 701/96; 701/37; 701/38; 701/65; 477/97; 477/120; 477/901; 340/439; 340/903; 180/271
(58) Field of Classification Search
USPC ............ 701/22, 29, 31.4, 37, 38, 65, 96, 200; 477/97, 120, 901; 340/439, 903; 180/97, 271
See application file for complete search history.

(56) References Cited

U.S. PATENT DOCUMENTS

| 4,400,779 | A | * | 8/1983 | Kosuge et al. ................. 701/123 |
| 4,564,905 | A | * | 1/1986 | Masuda et al. ..................... 701/1 |
| 4,845,630 | A | * | 7/1989 | Stephens ......................... 701/123 |
| 5,216,623 | A | * | 6/1993 | Barrett et al. ..................... 702/62 |
| 5,301,113 | A | * | 4/1994 | To et al. .......................... 701/123 |
| 5,505,076 | A | * | 4/1996 | Parkman et al. ............. 73/114.52 |
| 5,668,310 | A | * | 9/1997 | Parkman et al. ............. 73/114.52 |
| 5,892,346 | A |   | 4/1999 | Moroto et al. |
| 5,913,917 | A |   | 6/1999 | Murphy |
| 6,005,494 | A |   | 12/1999 | Schramm |
| 6,571,168 | B1 | * | 5/2003 | Murphy et al. ................ 701/123 |
| 6,591,185 | B1 | * | 7/2003 | Polidi et al. .................... 701/411 |

(Continued)

FOREIGN PATENT DOCUMENTS

DE  196 05 458 C1  9/1997
JP  2000 002553  1/2000

(Continued)

*Primary Examiner* — James P Trammell
*Assistant Examiner* — Majdi Alsomiri
(74) *Attorney, Agent, or Firm* — O'Shea Getz P.C.

(57) ABSTRACT

A method is provided for estimating a propulsion-related operating parameter of a vehicle for a road segment, and for determining routes based on the estimate. The method may be employed, for example, in a vehicle navigation system. In one example method, at least one operating parameter of the vehicle is estimated for the road segment based on information corresponding to the road segment. The propulsion-related operating parameter is estimated for the road segment using the at least one estimated operating parameter and at least one vehicle specific parameter. The at least one vehicle specific parameter is determined by acquiring driving data to determine a plurality of vehicle operating parameters while the vehicle is in operation. At least two of the determined vehicle operating parameters are used in a predetermined relationship that includes the at least one vehicle specific parameter. The at least one vehicle specific parameter is then determined from the driving data for the at least two vehicle operating parameters and the relationship.

18 Claims, 9 Drawing Sheets

(56) References Cited

U.S. PATENT DOCUMENTS

| | | | | |
|---|---|---|---|---|
| 6,931,309 | B2* | 8/2005 | Phelan et al. | 701/1 |
| 7,369,938 | B2* | 5/2008 | Scholl | 701/428 |
| 7,389,178 | B2* | 6/2008 | Raz et al. | 701/29.1 |
| 7,502,672 | B1* | 3/2009 | Kolls | 701/31.6 |
| 7,821,421 | B2* | 10/2010 | Tamir et al. | 340/901 |
| 8,190,318 | B2* | 5/2012 | Li et al. | 701/22 |
| 2004/0236474 | A1* | 11/2004 | Chowdhary et al. | 701/1 |
| 2004/0236475 | A1* | 11/2004 | Chowdhary | 701/1 |
| 2005/0137757 | A1* | 6/2005 | Phelan et al. | 701/1 |
| 2006/0111817 | A1* | 5/2006 | Phelan et al. | 701/1 |
| 2007/0112475 | A1 | 5/2007 | Koebler et al. | |
| 2008/0133120 | A1 | 6/2008 | Romanick | |
| 2009/0259355 | A1* | 10/2009 | Li | 701/22 |

FOREIGN PATENT DOCUMENTS

| | | | |
|---|---|---|---|
| JP | 2006 300780 | 11/2006 | |
| JP | 2008 101977 | 5/2008 | |
| JP | 2008 107155 | 5/2008 | |
| WO | WO 2007/061409 A2 | 5/2007 | |
| WO | WO 2007061409 A2 * | 5/2007 | G01C 21/34 |

* cited by examiner

METHOD OF ESTIMATING A PROPULSION-RELATED OPERATING PARAMETER

RELATED APPLICATIONS

This application claims priority of European Patent Application Serial Number 09 002 291.4, filed on Feb. 18, 2009, titled METHOD OF ESTIMATING A PROPULSION RELATED OPERATING PARAMETER; which application is incorporated in its entirety by reference in this application.

BACKGROUND

1. Field of the Invention

The present invention relates to navigation systems and more particularly, to route calculation based on propulsion-related operating parameters.

2. Related Art

Navigation systems for vehicles include route determination functions that generally determine routes from a starting point to a destination with the objective of minimizing either driving distance or driving time. Neither objective necessarily provides the most energy-efficient route. As the costs of energy and the focus on environmental conditions increase, drivers are becoming increasingly interested in taking the most energy-efficient route. Route determination based on energy efficiency makes use of functions and resources not normally associated with navigation systems such as predicting the energy consumption for road segments on alternative routes.

One difficulty with predicting fuel consumption for a given route is that fuel consumption varies according to the vehicle. The average fuel consumption varies between different makes and models. Even for a given model, the fuel consumption varies for different types of engines, different tires, different vehicle accessories, and other possible variables. Further variations in fuel consumption also arise from the driving style of the driver, and from environmental conditions, such as the type of road being traveled.

The variety of variables that factor into a vehicle's fuel consumption make it impractical as a function in a typical vehicle navigation system. Complex models for vehicles have been proposed. However, such models are based on the use of a large number of fixed, vehicle-specific parameters. These parameters may not be generally available for all types of vehicles and may not be available to the provider of the vehicle navigation system. The complexity and their use of an extensive parameter space make these models impractical for use in portable or dashboard-mounted navigation systems. The complexity is magnified by implementation for different vehicles and vehicle models. Conventional vehicle navigation systems are not equipped to determine energy-efficient routes with sufficient accuracy.

Accordingly, a need exists for a method that improves the estimation of propulsion-related operating parameters, such as fuel or energy consumption, or $CO_2$ emission, of a vehicle for a road segment. A need also exists for a vehicle navigation system capable of performing such estimation.

SUMMARY

In view of the above, a method is provided for estimating a propulsion-related operating parameter of a vehicle for a road segment. In an example method, at least one operating parameter of the vehicle is estimated for the road segment based on information corresponding to the road segment. The propulsion-related operating parameter is estimated for the road segment using the at least one estimated operating parameter and at least one vehicle specific parameter. The at least one vehicle specific parameter is determined by acquiring driving data to determine a plurality of vehicle operating parameters while the vehicle is in operation. At least two of the determined vehicle operating parameters are used in a predetermined relationship that includes the at least one vehicle specific parameter. The at least one vehicle specific parameter is then determined from the driving data for the at least two vehicle operating parameters and the relationship.

A method is also provided for determining a route in a navigation system. In an example method, road segments are retrieved from a database of the navigation system. The road segments are associated with cost values corresponding to a propulsion-related operating parameter. A route is determined from a starting point to a destination taking into account the cost values corresponding to the propulsion related operating parameter.

A navigation system is also provided. An example navigation system includes an interface unit providing an interface to a vehicle sensor system. A processing unit is also provided that is configured to estimate a propulsion-related operating parameter of the vehicle for a road segment. The navigation system determines routes based on the propulsion-related operating parameter.

It is to be understood that the features mentioned above and those yet to be explained below can be utilized not only in the respective combinations indicated, but also in other combinations or in isolation without departing from the scope of the invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Examples of navigation systems and methods implemented in, or in operation with, a navigation system are described with reference to FIGS. 1-9. In the various examples of implementations, the navigation system is configured to determine a fuel or energy efficient route to a destination, or a route with minimal $CO_2$ emission, which is roughly proportional to the fuel consumption for a vehicle with a combustion engine. Fuel consumption, energy consumption or carbon dioxide emission is considered to be propulsion-related operating parameters of the vehicle since these quantities characterize the operation of the motor propelling the vehicle. It is noted that examples of implementations may be utilized in navigation systems for all types of vehicles, such as vehicles propelled by a combustion engine, an electrical motor, by a hybrid drive (using a combination of combustion engine and electrical motor) or a fuel cell powered vehicle. While the following description refers to vehicles powered by a combustion engine to illustrate examples, it is to be understood that this description is not limiting and that navigation systems for any type of vehicle may be used as well. Insofar as the following description refers to fuel consumption, it should be understood that all the explanations are equivalently applicable to any other propulsion-related operating parameter of a vehicle, such as an energy consumption, which includes electrical energy, a carbon dioxide emission and other propulsion-related operating parameters.

Figure 1:
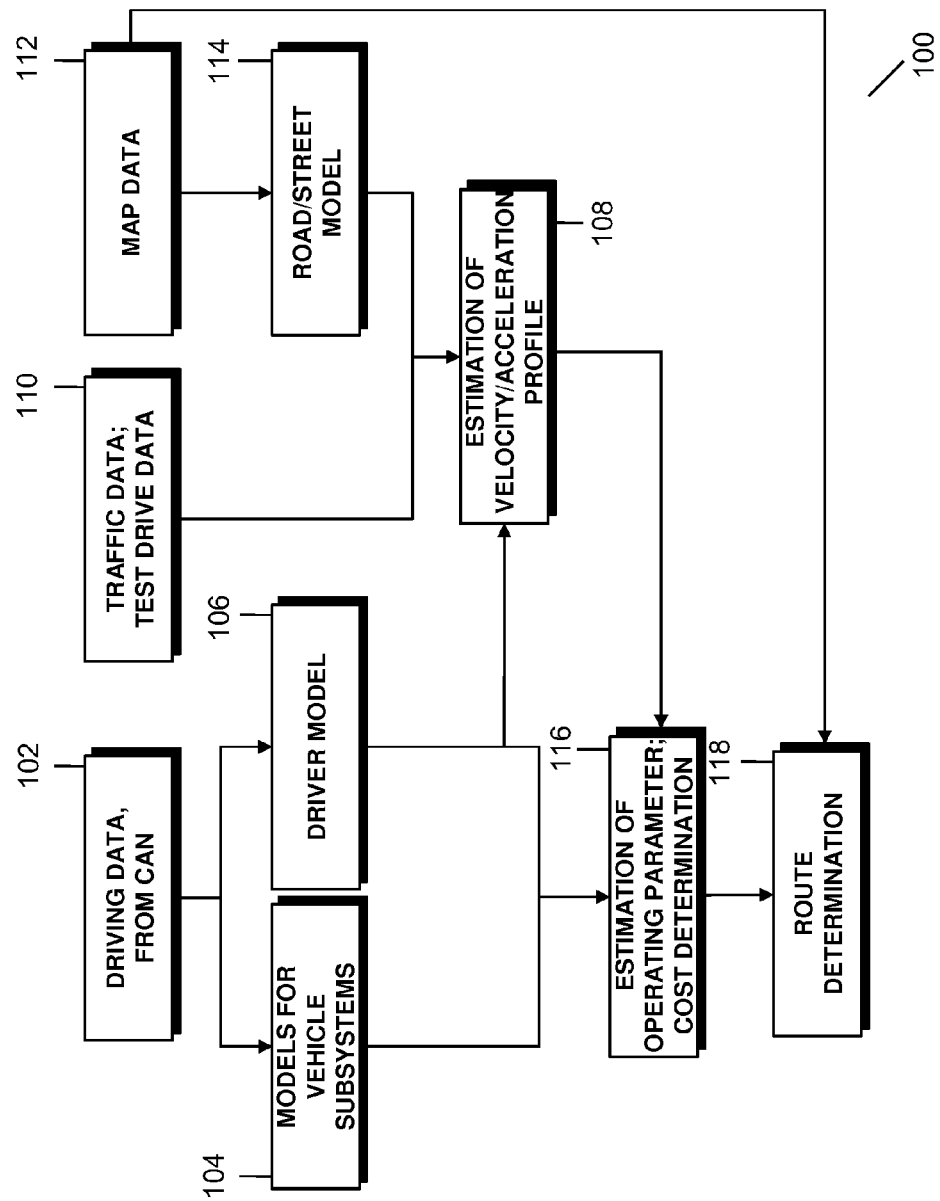
FIG. 1 is a block diagram illustrating the processing of data from different data sources in one example of an implementation.

In one example of an implementation of a navigation system, the navigation system determines fuel (or energy) efficient routes based on cost values assigned to road segments in map data. In operation, the reliability and accuracy of the route determination results corresponds to the precision with which the costs assigned to the road segments reflect the fuel consumption predicted for the road segment. With the aim of maximizing this precision, driving data is acquired from a plurality of data sources and utilized to estimate the fuel consumption on a road segment. FIG. 1 is a block diagram of one example of a navigation system 100 illustrating the processing of data from different data sources in one example of an implementation.

As shown in FIG. 1, four factors may influence the fuel consumption of the vehicle on a road segment. One factor is the vehicle itself. For example, the vehicle may have a certain aerial drag, a certain motor efficiency, a certain rolling drag and certain other parameters. Another factor is the driver of the vehicle. The driver may operate the vehicle fuel efficiently, by for example changing gears early. The driver may also be one that may operate the vehicle inefficiently. Another factor is the traffic to be encountered on the road segments. Fuel consumption may increase in stop and go traffic, and it may settle at a lower value when the vehicle is travelling at constant speed. A fourth factor is the road. The properties of the road on which the vehicle is travelling may affect fuel consumption. For example, fuel consumption may increase at high travelling speeds on a highway, or on steep and winding roads; and reach moderate levels on straight roads with few inclines and limited travelling speed.

The block diagram in FIG. 1 one example of a navigation system 100 shows a driving data source 102, a traffic data source 104, and a map data source 112. The data obtained from these data sources 102, 110, 112 may be processed or utilized in relationships to obtain other data or parameters used to obtain the energy-efficiency parameters.

The driving data source 102 provides data directly from the vehicle and may include data obtained while the vehicle is in operation. The driving data source 102 may be a source of different operating parameters of the vehicle that may be obtained from a bus system in the vehicle, such as for example, a control area network ("CAN"). The driving data obtained from the driving data source 102 may be utilized in physical models 104 for subsystems of the vehicle to determine vehicle specific parameters such as a transmission ratio, a rolling drag coefficient ($c_R$), an aerodynamic drag coefficient ($C_L$), a resistance to acceleration coefficient ($c_B$), and climbing resistance. The driving data obtained from the driving data source 102 may also be utilized in a driver model 106 to determine driver specific parameters such as, a maximum or an average velocity, a velocity or a motor rotation speed at which the driver changes gears, and other similar parameters. The vehicle models 104, the driver model 106, and the determined vehicle or driver specific parameters may be utilized with a velocity or acceleration profile 108 with which the vehicle is expected to travel on the road segment to estimate the fuel to be consumed for a given road segment.

The estimation of the velocity or acceleration profile 108 may receive traffic data, or other data such as data from test drives, from the traffic data source 110. The map data source 112 provides map data, which includes links and nodes describing a road network. The links and nodes may be analyzed by a road/street model 114, which may determine parameters characterizing a particular road segment included in the map data. The estimation of the velocity or acceleration profile 108 may also use driver specific parameters delivered by the driver model 106. For example, the estimation of the velocity or acceleration profile 108 for a road segment may depend on the size of the road, the shape of the road, the incline of the road (obtained from the road/street model 114), the current traffic situation on the road (obtained from the traffic data source 110) and the driving habits of the driver (obtained from the driver model 106).

An estimation of propulsion-related operating parameter 116 of the vehicle, such as fuel consumption, may be performed using the estimation of the velocity or acceleration profile 108. The estimation of the velocity or acceleration profile 108 may be based on the vehicle subsystems model 104 and corresponding determined vehicle-specific parameters. The estimation of propulsion-related parameters 116 may be performed for any road segment in the map data source 112 even if the vehicle has not traveled on the road segment. The expected fuel consumption may be estimated for a number of road segments included in the map data source 112 on an individual road segment basis, or for certain types or classes of road segments. By estimating fuel consumption for types or classes of road segments, the processing may be performed faster and the results would occupy less memory space for storing the estimated values. The estimation of the propulsion-related parameters 116 may also include functions for determining a cost value to assign to the road segment or to the type or class of road segment. Using the velocity profile for the road segment determined from estimation of the velocity or acceleration profile 108, the estimation of the propulsion-related parameters 116 may also include functions for determining time to travel the road segment, and a corresponding cost value may be assigned to the road segment.

A route determination function 118 may be utilized to determine a route to a destination, which may be entered by a user of the navigation system 100. The route determination function 118 may base the route on the map data and on the assigned cost values. The route determination function 118 may determine routes based on distance or travel time. The route determination unit 118 may also consider fuel or energy consumption of the vehicle for a particular route. The route determination unit 118 may provide alternative routes from which the driver may choose or select routes based on a pre-defined criteria such as distance, time, or efficiency. The route determination unit 118 may also consider different weighted cost factors for determining a route, which may be weighted, for example, according to user preferences, or it may minimize a particular type of cost value, such as cost values corresponding to fuel consumption.

The navigation system 100 shown in FIG. 1 estimates fuel consumption or other propulsion-related operating parameters for any given map data. The navigation system 100 may also provide such estimates for propulsion-related operating parameters after receiving updated map data or map data for a new geographic region. The navigation system 100 may perform propulsion-related operating parameter estimation as soon as enough driving data is collected for determining the vehicle or driver specific parameters from the vehicle subsystem model 104 and driver model 106. Until enough driving data is collected, default values may be used for these parameters. The collection of driving data 102 may be performed continuously during operation of the vehicle, which may result in improved accuracy over time. The navigation system 100 may also easily adapt to a new driver, or to a new vehicle.

The vehicle navigation system 100 may be a dashboard-mounted, a fixed navigation system, or a portable navigation system. The navigation system 100 may be used in different vehicles and by different drivers. Parameters for vehicle and driver models may be stored and retrieved for a corresponding current driver and vehicle.

The navigation system 100 in FIG. 1 utilized the vehicle model 106 to determine vehicle specific parameters that are used to determine propulsion-related operating parameters during vehicle operation. The navigation system 100 may not need to obtain specific or detailed vehicle information from other sources. In one example of an implementation, the fuel consumption may be predicted using the information related to the road segments and the determined parameters. The navigation system 100 determines relationships based on the dynamics of the vehicle in which it is installed, and makes predictions of fuel consumption based on road data. The total fuel amount expected to be consumed for a calculated route may also be determined.

Those of ordinary skill in the art will understand that the components in FIG. 1 may be organized or configured in many different ways and include more or fewer data sources. For example, in one example of an implementation, the driver model 106, the road/street model 114 and traffic data 110 may not be used for estimating the propulsion related operating parameter and performing the route determination.

Figure 2:
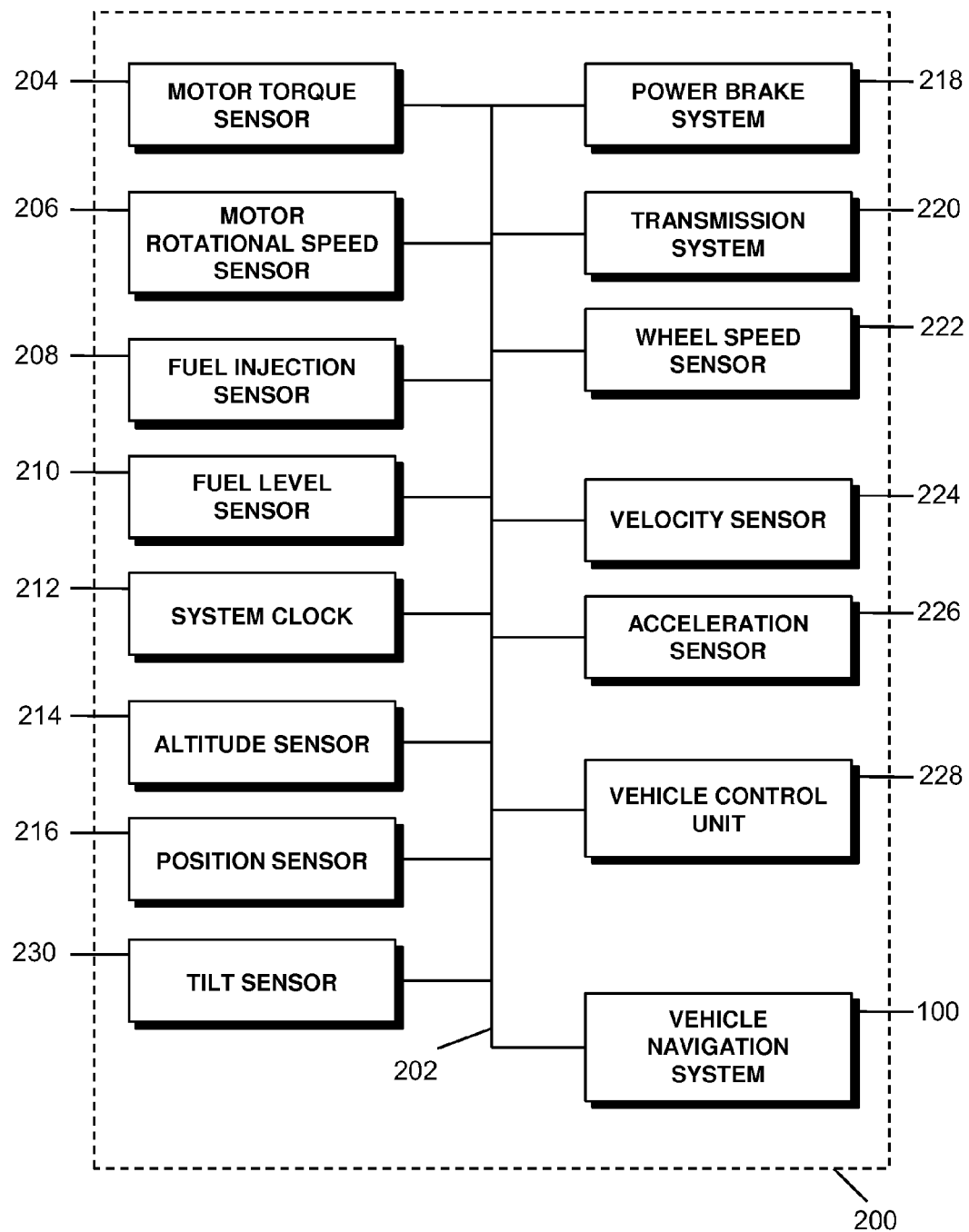
FIG. 2 is a block diagram illustrating example data sources in a vehicle having one example of an implementation of a navigation system.

FIG. 2 is a block diagram illustrating example data sources in a vehicle 200 having one example of an implementation of a navigation system 100. The block diagram in FIG. 2 illustrates a vehicle 200 having the vehicle navigation system 100 connected to a vehicle network 202, such as for example, a controller area network ("CAN"). The vehicle network 202 may be connected using any suitable wireless or wired network infrastructure. A number of sensors and systems may be connected to the vehicle network 202 as shown in FIG. 2. The sensors and systems in FIG. 2 include a motor torque sensor 204, a motor rotational speed sensor 206, a fuel injection sensor 208, a fuel level sensor 210, a system clock 212, an altitude sensor 214, a position sensor 216, a tilt sensor 230, a power brake system 218, a transmission system 220, a wheel speed sensor 222, a velocity sensor 224, an acceleration sensor 226, and a vehicle control unit 228. Driving data may be acquired by the vehicle navigation system 100 via the sensors or systems connected to the vehicle network 202. The driving data collected may then be used to obtain determined operating parameters.

The acquisition of the driving data may be performed while a motor of the vehicle 200 is running. The motor torque sensor 204 senses the torque being produced or applied by the motor of the vehicle 200. The motor rotational speed sensor 206 senses the rotational speed of the motor of the vehicle 200 to determine the motor's revolutions per minute (RPM). The fuel injection sensor 208 may deliver an amount of fuel injected into the motor of the vehicle 200, which may be utilized to determine the fuel consumption, or the amount of fuel being consumed. Other sensors may be used for determining fuel consumption, such as a fuel flow sensor and other suitable sensors. The fuel level sensor 210 senses the current filling level of the fuel tank of the vehicle 200. The system clock 212 provides timing information, which may be utilized for time dependent acquisition of driving data. The altitude sensor 214 detects the current altitude of the vehicle 200, which may be, for example, based on atmospheric pressure or position obtained by a global positioning system ("GPS"). The position sensor 216 provides the current position of the vehicle 200. The position sensor 216 may be a GPS device. The tilt sensor 230 detects the tilt of the vehicle 200. The power brake system 218 senses and provides the current braking pressure. The transmission system 220 provides the currently engaged gear. The wheel speed sensor 222 provides the current rotational speed of the wheels of the vehicle 200. In one example, the transmission system 220 may provide information on the transmission ratios or on the rotational speeds of the wheels of the vehicle 200. The velocity sensor 224 senses a current velocity v(t) and the acceleration sensor 226 senses a current acceleration a(t) of the vehicle 200.

It is to be understood by those of ordinary skill in the art that the sensors shown in FIG. 2 are examples of sensors that may be included in the vehicle 200. In addition, more or fewer sensors may be included in other implementations. The sensors and systems connected to the vehicle network 202 may depend on which relationships may be available and used to obtain determined operating parameters. For example, if the diameter of the wheels of the vehicle is known, the current vehicle velocity and acceleration may be determined from the rotational speed, or from changes in the rotational speed, of the wheels obtained from the wheel speed sensor 222. The vehicle navigation system 100 may also acquire driving data to determine operating parameters from other vehicle systems, or from data sources other than the vehicle network 202. For example, the navigation system 100 may acquire vehicle velocity, current fuel consumption, and current motor rotational speed and torque from sensors or systems connected to the vehicle network.

Figure 3:
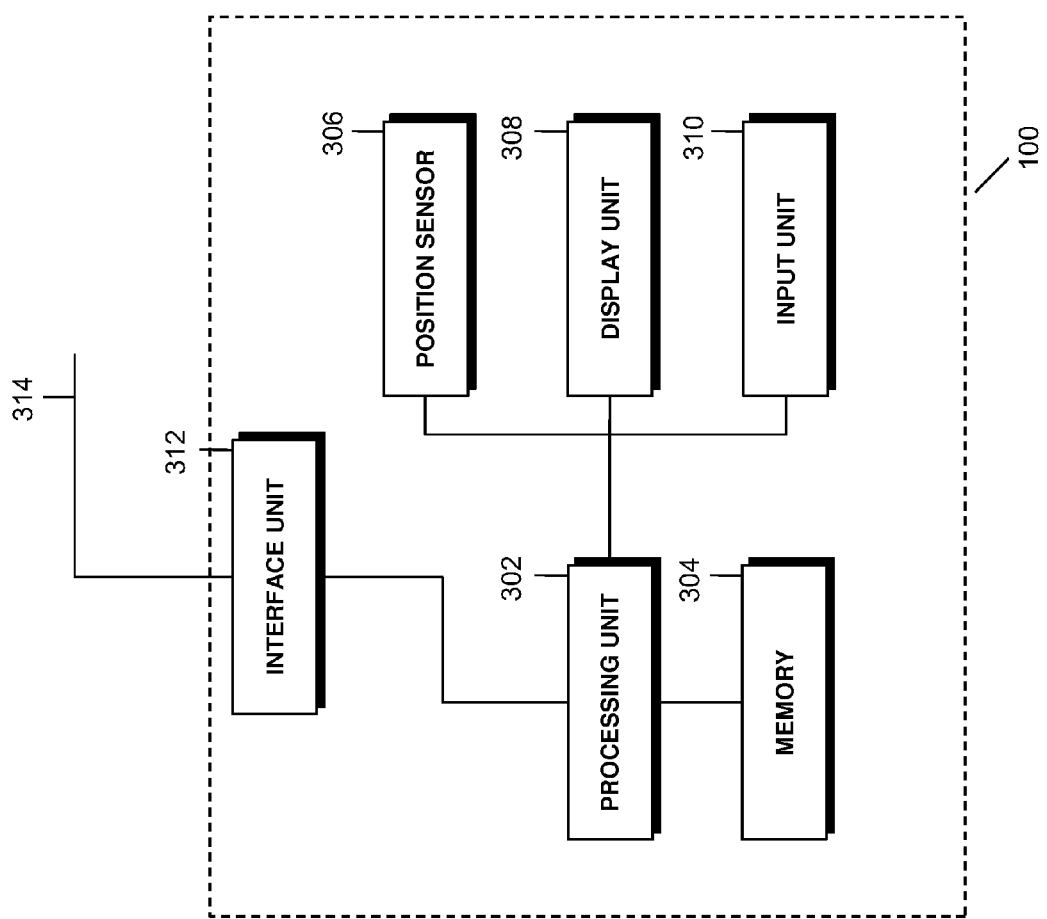
FIG. 3 is a block diagram of one example of an implementation of a navigation system.

FIG. 3 is a block diagram of one example of an implementation of the navigation system 100. The navigation system 100 includes a processing unit 302, memory 304, a position sensor 306, a display unit 308, an input unit 310, and an interface unit 312. The processing unit 302 may include any computer processing device that executes control instructions stored as software in the memory 304. The processing unit 302 may be configured as a single processor, as multiple processors, or may include general purpose or special purpose microprocessors or digital signal processors. The memory 304 may include several types of memory, such as random access memory (RAM), read only memory (ROM) and other types of non-volatile memory, such as a flash memory, a magnetic storage drive and other suitable memory devices. The non-volatile memory may include EPROM or EEPROM, and may be installed in the navigation system 100 in fixed or removable form in, for example, a memory card. The memory 304 may also include CD-ROM, DVD-ROM, or any other type of data storage device accessible by navigation system 100. The memory 304 may store the control information, or software, for operating the navigation system 100 as well as other data used during operation, such as for example, map data and other information. The memory 304 may provide storage space, for a database in order to store the above-mentioned vehicle specific or driver specific parameters, acquired driving data, estimated operating parameters, determined operating parameters, determined cost values and other data. The memory 304 may also store models for vehicle subsystems, driver models or road/street models.

During operation, the processing unit 302 executes software that control the functions of the navigation system 100. The navigation system 100 may acquire driving data via the interface unit 312, and use the data in functions for determining the vehicle or driver specific parameters. The processing unit 302 may execute functions related to the data sources, data functions, sensors and systems described with respect to FIG. 1. For example, the processing unit 302 may execute programmed functions for estimating a velocity or acceleration profile based on the map data and possibly traffic data. The processing unit 302 may also perform functions for estimating of the propulsion-related operating parameters, such as the fuel consumption based on the determined vehicle specific parameters. The processing unit 302 may also perform functions for determining cost values and route calculations based on the determined cost values.

The interface unit 312 provides a connection to the vehicle network 202 of the vehicle 200 via a communications connection 314. The interface unit 312 may provide a wired or wireless interface depending on the type of connection used for the communications connection 314. The interface unit 312 provides an interface over which the processing unit 302 receives data for a range of determined operating parameters, which are used to estimate propulsion-related operating parameters.

The processing unit 302 may receive position data from the position sensor 306, which may be a GPS sensor, for determining a current position of the navigation system 100. The display unit 308 displays information, such as a calculated route or alternative routes, to a user of navigation system 100. The input unit 310 may be used by the user to enter a destination, configuration parameters, and other user-provided information.

It is noted that the navigation system 100 may include other components, some of which may be typical of other navigation systems, such as an input/output unit for providing an interface between the processing unit 302 and the other components, a microphone and a loudspeaker for receiving voice commands or giving out driving directions, and other components. The navigation system 100 may be a built-in navigation system mounted to a dashboard of a vehicle, where display unit 308 and input unit 310 may be provided at any location inside the vehicle, or it may be a portable electronic device, such as a personal navigation system (PND), a mobile phone, a personal digital assistant, or other device. The navigation system 100 may also be connected to another vehicle system to share resources with another processor-controlled system. For example, the display 308 and input unit 310 may be resources that are shared with a vehicle user interface to an audio system, or to a vehicle control system. Other resources including the processing unit 302 may be shared with other systems.

Functions may be programmed for execution by the processing unit 302 to determine the vehicle specific parameters, estimates of propulsion-related operating parameters and associated cost values, and energy-efficient routes based on the propulsion-related operating parameter. The following describes the relationships and parameters used to determine the propulsion-related parameters. In the description below, the propulsion-related operating parameter being determined is the fuel consumption b(t) of the vehicle. Those of ordinary skill in the art will understand that other propulsion-related operating parameters may be determined based on the principles illustrated in the description below.

The total fuel consumed over a drive between two points in time t(a) and t(e) may be determined as:

$$B = \int_{t_a}^{t_e} \frac{1}{\eta_M \eta_K H_u} [F_R(t) + F_B(t) + F_L(t) + F_S(t)] v(t) dt \quad (1)$$

where:
$F_R$=frictional force for the rolling drag
$F_B$=inertial force opposing acceleration
$F_L$=aerodynamic drag
$F_S$=climbing resistance
$\eta_M$=motor efficiency factor
$\eta_K$=transmission efficiency factor
$H_u$=fuel value Equation 1 may be described as expressing the work performed by the vehicle to overcome the frictional force for the rolling drag $F_R$, the inertial force $F_B$ resisting acceleration, the force resulting from aerodynamic drag of the vehicle $F_L$, and the climbing resistance $F_S$. The total fuel consumption B may also depend on the motor efficiency factor $\eta_M$, the transmission efficiency factor $\eta_K$, and the fuel value $H_u$ of the fuel used. The forces used to determine the fuel consumption B depend on individual properties of the vehicle. For example, the properties may be quantified based on parameters determined from acquired driving data. Some of the parameters may also depend on the individual driver of the vehicle permitting determination of the fuel consumption for particular drivers.

In Equation 1, the value $F_B$ depends on the acceleration a(t) of the vehicle and the value $F_L$ is proportional to the square of the velocity v(t) of the vehicle. The climbing resistance $F_S$ may be calculated, given a sufficiently precise resolution of the map data regarding height differences. The climbing resistance $F_S$ may be used in determining the total segment cost. Although there is no difference in energy due to differences in height for two given routes starting at the same point and leading to the same destination, the resulting energy consumed by driving along the different routes may vary due to different engine operation points or different dispersals of the inclinations. Another force that may be considered is braking resistance $F_V$, which determines energy losses resulting from actuating the brakes.

One element of the inertial force $F_B$ is a fraction, λ, which is an indication of the moment of inertia of rotating components of the vehicle. The parameter λ changes when the vehicle switches to a different engaged gear, which will be designated as k. The efficiency factors $\eta_M$ and $\eta_K$ may depend on the rotational speed of the engine and the current load, or the currently produced torque. Those of ordinary skill in the art would understand the manner in which the above-mentioned forces may be calculated based on vehicle parameters. Accordingly, a more detailed discussion is not necessary.

A transmission ratio $I_K = n_M/n_R$ may be defined, where $n_M$ is the rotational speed of the motor or engine of the vehicle, and $n_R$ is the rotational speed of the wheels of the vehicle. The transmission ratio $I_E$ is affected by the engaged gear. The engaged gear not only affects the efficiency of the motor and the transmission, but also the parameter $\lambda$, the resistance against acceleration and the force experienced when decelerating or braking.

In general, the forces mentioned above cannot be measured in a conventionally equipped vehicle. When the vehicle is moving, the engine of the vehicle produces a torque M(t), which is transferred by the transmission to the wheels of the vehicle and overcomes the above-described forces. The engine thus produces a certain power P(t). The work performed by the vehicle and accordingly, the fuel consumed by the vehicle may also be expressed as an integral over the power P(t) produced by the engine. The power produced by the engine can then be expressed as:

$$P(t) = M(t) n_M(t) \quad (2)$$

where:
M(t)=torque at time t
$n_M(t)$=rotational speed of the engine

Based on Equation 2, the fuel consumption may be determined from the torque M(t) and the rotational speed of the engine $n_M(t)$, which may be obtained by the navigation system 100 over the interface to the vehicle network 202 (in FIG. 1). However, other factors may influence the fuel consumption of the vehicle. For example, the actuation of the brake pedal, the clutch, and other perturbations such as wind and incline. Internal frictional resistances in the vehicle and energy loads from auxiliary devices, such as lights, heating elements and other devices, may result in added torque generated by the engine. In one example of an implementation, an additional torque $M_{int}$, representing the added torque for auxiliary energy demand and internal frictional resistances is introduced into the power expression in Equation 2 as:

$$P(t) = (M(t) + M_{int}) n_M(t) \quad (3)$$

Combining with Equation 1, the total fuel consumption may then be expressed as:

$$B = \frac{1}{\overline{\eta}_M \overline{\eta}_K H_u} \int_{t_a}^{t_e} (M(t) + M_{int}) n_M(t) dt \quad (4)$$

where
$\overline{\eta}_M, \overline{\eta}_K$ are mean efficiencies for the motor and the transmission of the vehicle.

In one example of an implementation, values for M(t) and $n_M(t)$ may be determined from values for the determined operating parameters gear k(t), velocity v(t), acceleration a(t) and braking pressure p(t). The operating parameters gear k(t), velocity v(t), acceleration a(t) and braking pressure p(t) may also be estimated using map data.

The forces described above may also be determined using vehicle specific parameters, such as the vehicle weight, and aerodynamic drag coefficient $c_x$ of the vehicle, the air pressure $\rho$, a projected frontal area A of the vehicle and others. These vehicle-specific parameters are characteristic of specific vehicles. Accordingly, vehicle-specific parameters are generally not calculated from driving data acquired for determined operating parameters. For example, vehicle specific parameters may be determined if proportional to above-mentioned parameters or to quantities that use the above-described parameters. The vehicle specific parameters may also be determined for different driving phases, which may facilitate the evaluation of some parameters since certain parameters may not be relevant for certain driving phases. For example, the vehicle may be divided into subsystems, such as the clutch, transmission, engine and consumption. The driving phases shown in TABLE A may be considered below.

TABLE A

| Driving Phase | Description |
|---|---|
| Rest | Vehicle at rest, or velocity v(t) = 0. An error margin or threshold value for the velocity may be used to determine that the vehicle is at rest. |
| Take off | The vehicle is starting to move. Velocity v(t) ≠ 0, is below a threshold value $v_{min}(k)$ and above a threshold level of the "rest" phase. |
| Constant drive | The vehicle is in the constant driving phase. Current velocity exceeds the respective threshold value $v_{min}(k)$, and the acceleration|a(t)| is below a certain threshold value $a_{min}$. Acceleration a may be negative indicating a deceleration. |
| Driving without applied brakes | Vehicle is moving without applied brakes. The current velocity exceeds the threshold value $v_{min}(k)$ and no braking pressure p is detected: p(t) = 0. The vehicle may accelerate or decelerate in response to an application of torque by the engine. |
| Driving with applied brakes | The vehicle is moving with brakes applied. The current velocity exceeds the corresponding threshold value $v_{min}$ (k) and a braking pressure, p(t) ≠ 0, is detected. An error margin may again be used for detecting a non-zero braking pressure. |
| Driving in general | The vehicle is generally moving when the current velocity exceeds the threshold value $v_{min}(k)$. |

Driving data acquired from the vehicle network 202 (in FIG. 2) may be used by functions executed by the processing unit 302 of the navigation system 100 to determine the vehicle's driving phase. Different models may be used for each driving phase to determine vehicle specific parameters for different vehicle subsystems as described below with reference to FIG. 4.

Figure 4:
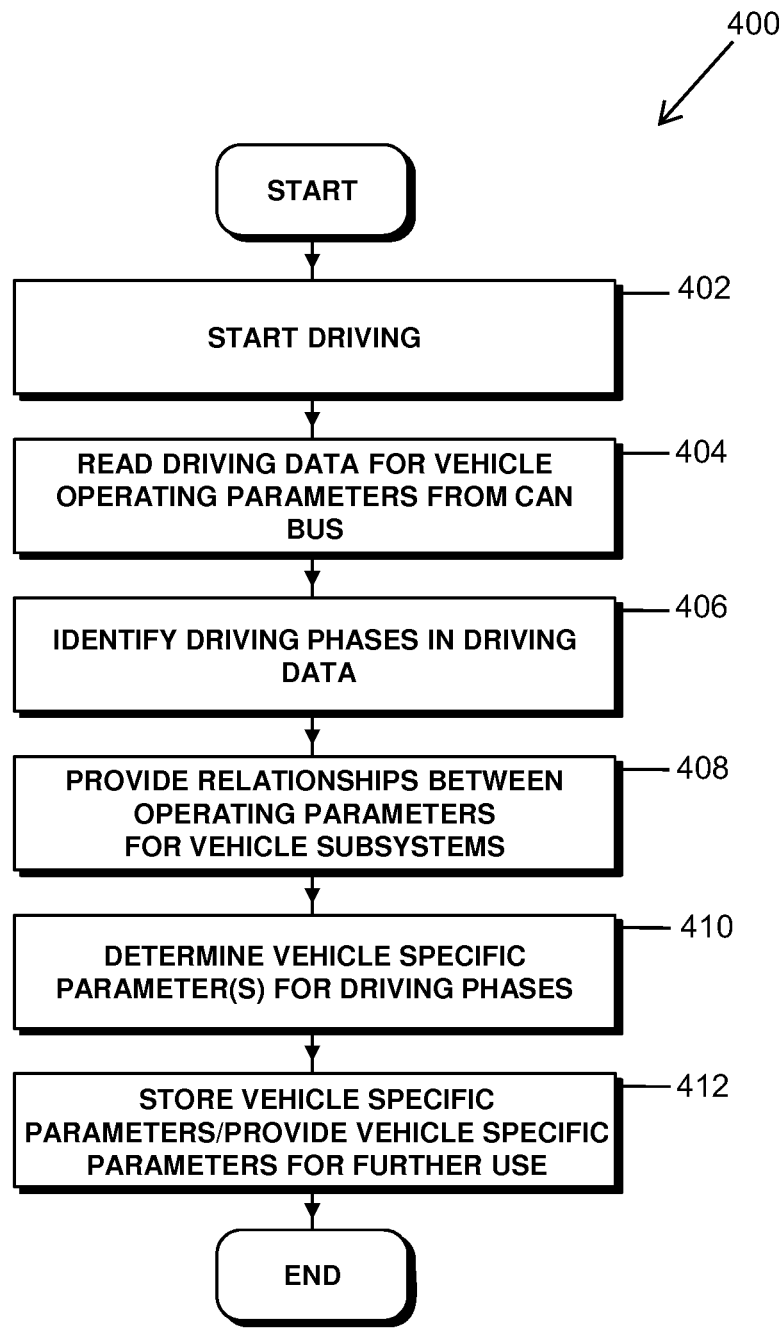
FIG. 4 is a flowchart illustrating operation of an example of a method for obtaining and maintaining vehicle and operating parameters utilized for estimating propulsion-related parameters.

FIG. 4 is a flowchart illustrating operation of an example of a method for obtaining and maintaining vehicle and operating parameters used for estimating propulsion-related parameters. The example method illustrated in FIG. 4 may be performed by the vehicle navigation system 100 connected to the vehicle network 202 of the vehicle 200 as described above with reference to FIGS. 1-3.

At step 402, the vehicle is started to commence operation. The vehicle may be operated with the engine idling, or driving at a constant speed, or the vehicle may be accelerating or decelerating. While the vehicle is in operation at step 404, driving data is acquired via the vehicle network 202, which is assumed for purposes of illustration in FIG. 4 to be the CAN-bus. The driving data may be used to determine or calculate any type of operating parameter. Some operating parameters may be measure directly from data collected over the CAN-bus; others may be calculated from the driving data acquired. In one example of an implementation, the determined operating parameters include driving data acquired directly, such as: current gear, current velocity, and current braking pressure. Current acceleration may also be acquired or may be determined from the current velocity (for example, as a derivative over time).

At step 406, the vehicle's driving phases are identified by analyzing the acquired driving data. The driving data may be processed as described in TABLE A to determine the driving phases. At step 408, relationships between operating parameters for vehicle subsystems are provided. At step 410, the vehicle specific parameters for the different driving phases are determined using the relationships provided. The vehicle specific parameters and the relationships utilized to determine the vehicle specific parameters are described as follows.

Figure 7:
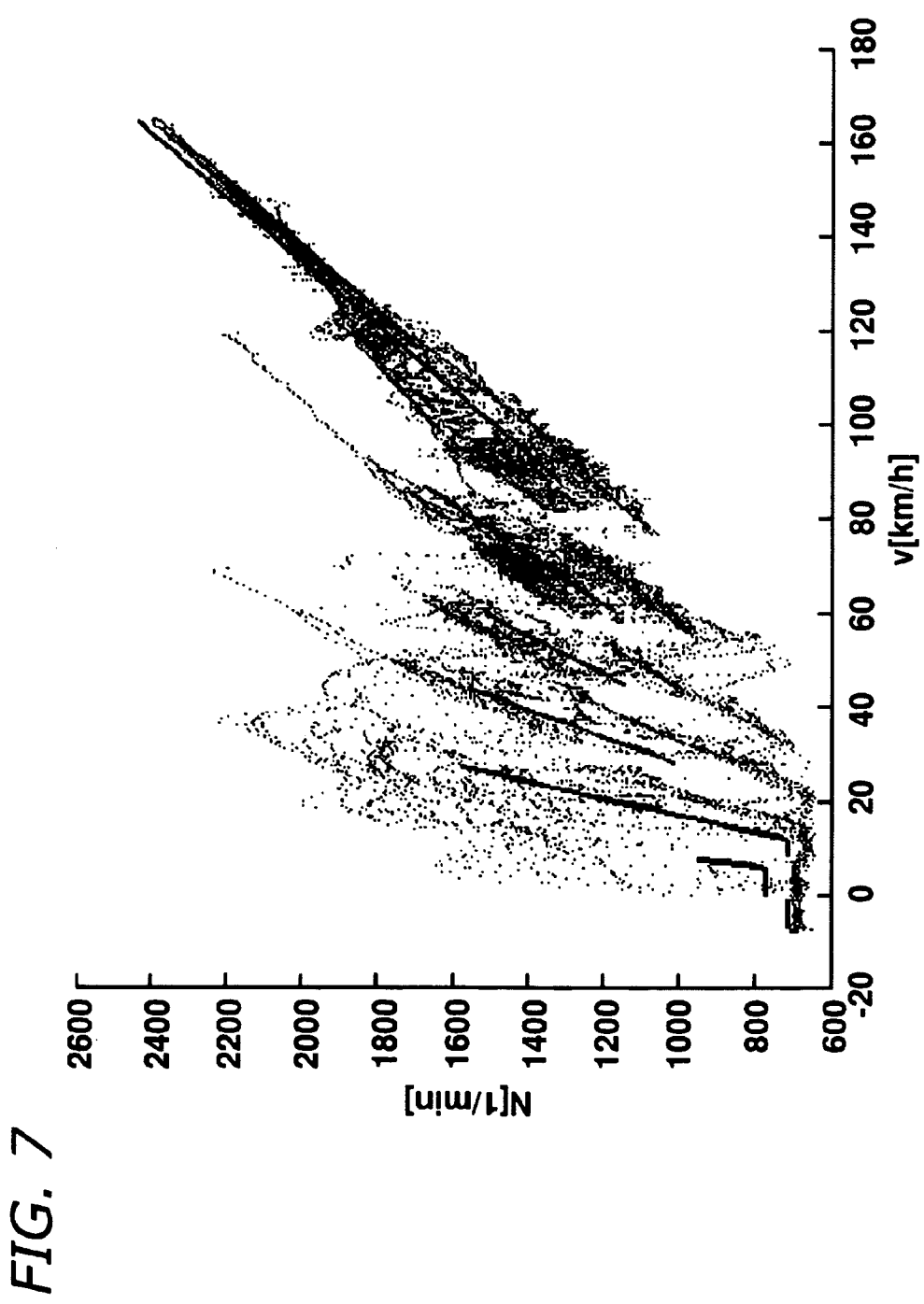
FIG. 7 is a graph of driving data acquired for velocity and motor rotational speed.

The vehicle specific parameters may be determined to enable the estimation or prediction of the fuel consumption based on a velocity and/or acceleration profile. The fuel consumption depends on the rotational speed of the motor $n_M$. The vehicle specific parameter may be a vehicle specific constant, i, which may be defined for each gear, k, for converting the velocity of the vehicle into the rotational speed of the motor:

$$n_M = iv \quad (5)$$

where
$n_M$=the rotational speed of the motor
i=vehicle specific constant relative to gear k, also i(k)
v=velocity of the vehicle The vehicle specific constant, i, is proportional to the transmission ratio and may be determined for each gear k. The constant i(k) may be determined by acquiring driving data for the velocity and the rotational speed of the motor, and by using a statistical method, such as a least mean squares method using a linear regression. An example of driving data graphed with velocity as a function of rotational speed is shown in FIG. 7. There may be slippage during the engagement of the clutch, which may influence the above relationship. The constant i(k) is determined during the "general driving" phase with the threshold value $v_{min}(k)$ set high enough to account for the operation of the clutch.

In the "rest" driving phase, the vehicle specific parameter may be the mean rate fuel consumption. The fuel consumed while the engine is idling is not negligible, which is due in part to the added fuel consumed while auxiliary devices are operating in the vehicle. The current fuel consumption may be acquired from the vehicle network 202 (in FIG. 2) and averaged over all consumption data acquired in the "rest" phase.

Vehicle specific constants for determining the torque output of the motor of the vehicle are determined during the third, fourth and fifth of the driving phases shown in TABLE A. During the "constant driving" phase, the torque M(t) and the velocity v(t) may be determined from the following relationship:

$$M(t) = \tilde{c}_R + \tilde{c}_L v(t)^2 \quad (6)$$

where
$\tilde{c}_R \propto c_R$
$\tilde{c}_L \propto c_L$

Figure 8:
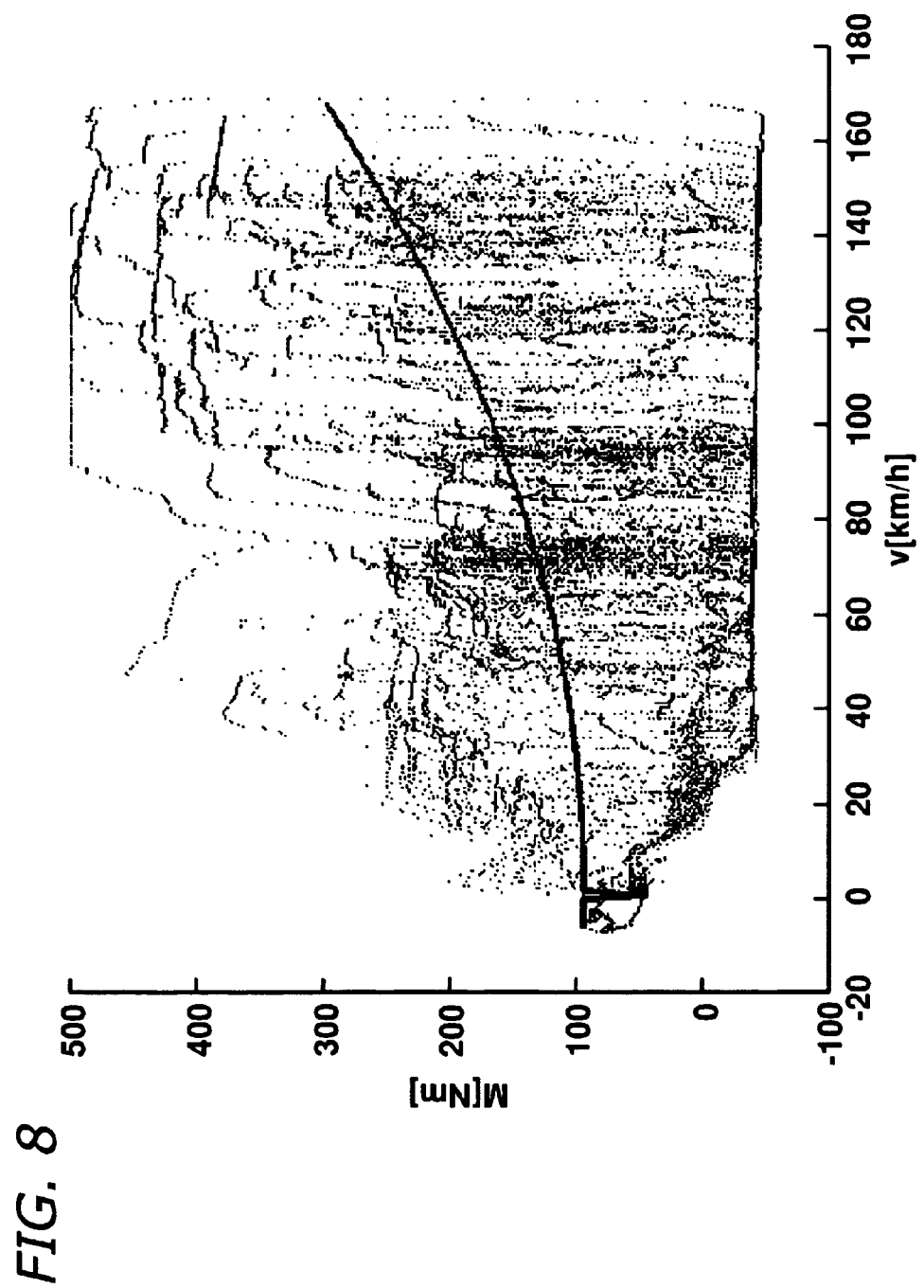
FIG. 8 is a graph of driving data acquired for velocity and torque.

The vehicle specific parameters, $\tilde{c}_R$ and $\tilde{c}_L$, are proportional to the rolling drag coefficient, $C_R$, and the aerodynamic drag coefficient, $C_L$, of the vehicle, respectively, and may be determined by acquiring driving data for M(t) and v(t). FIG. 8 is a graph illustrating an example of driving data and a curve corresponding to the relationship fitted to the driving data. The vehicle specific parameters $\tilde{c}_R$ and $\tilde{c}_L$ may be determined from a regression equation using a least mean squares method, and used to predict a motor torque from a given velocity profile.

While in the "constant driving" phase, a coefficient $\tilde{c}_B$ may be determined based on the coefficients $\tilde{c}_R$ and $\tilde{c}_L$. The coefficient $\tilde{c}_B$ is proportional to a resistance against acceleration coefficient. In the "driving without applied brakes" driving phase, the acceleration or deceleration of the vehicle a(t) is relevant, and the torque may be determined from the following relationship:

$$M(t) = \tilde{c}_R + \tilde{c}_B(k)a(t) + \tilde{c}_L v(t)^2 \quad (7)$$

where
$\tilde{c}_R \propto c_R$
$\tilde{c}_L \propto c_L$
$\tilde{c}_B \propto c_B$ The vehicle specific parameter, $c_B$, depends on the gear in which the vehicle is operating, and is determined for each gear separately. The driving data for v(t) and M(t) for each gear for which the absolute value of the acceleration exceeds the threshold determined for the driving phase may be used to determine the vehicle specific parameter $c_B$. The data obtained from the vehicle network 202 may be organized in data sets for each gear. The vehicle specific parameter $\tilde{c}_B$ may then be determined for each data set using a least mean squares method.

Figure 9:
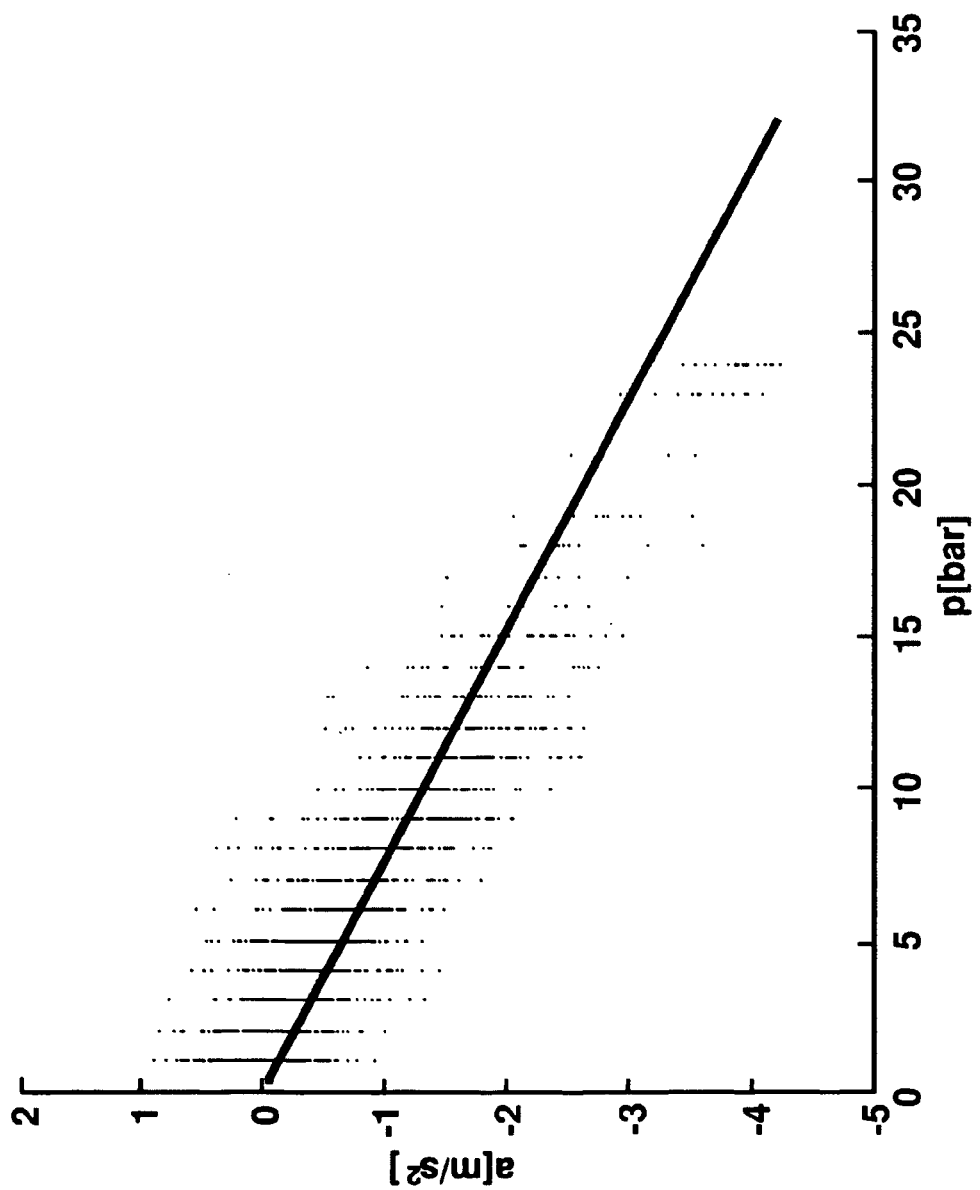
FIG. 9 is a graph of driving data acquired for breaking pressure and acceleration.

In the "braking phase," the vehicle is decelerated by application of the brakes. The additional deceleration may be described by $\Delta a(t) = \tilde{\theta}p(t)$, where the factor $\tilde{\theta}$ may not depend on the currently engaged gear. The motor torque during the "braking phase" may be determined from:

$$M(t) = \tilde{c}_R + \tilde{c}_B(k)[a(t) + \tilde{\theta}p(t)] + \tilde{c}_L v(t)^2 \quad (8)$$

where
$\tilde{c}_R \propto c_R$
$\tilde{c}_L \propto c_L$
$\tilde{c}_B \propto c_B$
$\tilde{\theta}$ is a constant defining a deceleration per unit of pressure applied to the brake The parameters, $\tilde{c}_R$, $\tilde{c}_B$ and $\tilde{c}_L$, may be determined as described above. The parameter $\tilde{\theta}$ may be determined from the driving data acquired during braking phases, which is when the braking pressure p(t)>0. The vehicle specific parameter $\tilde{\theta}$ may be determined using a statistical method such as, a least mean squares method, applied to the acquired driving data during the braking phase. A graph illustrating an example of driving data during braking is shown in FIG. 9 where the pressure p is plotted against the acceleration, a. The vehicle specific parameter $\tilde{\theta}$ is the slope of the fitted line shown in FIG. 9.

The "take off" driving phase factors in the operation of the clutch, or gear shifting mechanism, of the vehicle. For example, if the vehicle is decelerated while in gear k, the driver operates the clutch when the vehicle speed drops below the threshold value of $v_{min}(k)$, to avoid engine shut off. If the clutch is engaged, the engine generally idles at a predetermined minimal rotational speed, which may be determined from the minimum rotational speed of the engine acquired from the vehicle network 202. The threshold value of the velocity may then be determined from:

$$v_{min}(k) = \frac{n_{M,min}}{i(k)} \quad (9)$$

where $v_{min}(k)$=minimum velocity at gear k
$n_{M,min}$=minimum rotational speed
$i(k)$ is proportional to transmission ratio at gear k Below this threshold velocity, the vehicle may not be operating at the minimum rotational speed. If the vehicle is accelerating, high rotational speeds may result, and some vehicles may adapt the idling speed dynamically to the vehicle velocity. In one example of an implementation, the mean rotational speed measured for the engine is used in determining the fuel consumption. The torque output of the engine in the "take off" phase may be determined using the relationship described with respect to the braking phase (Equation 8).

The relationships described above with reference to Equations 1 through 8 may be used to determine a range of vehicle specific parameters from the driving data acquired for the given vehicle operating parameters. It is to be understood that the above relationships and vehicle specific parameters are described as examples and that other relationships and other operating parameters may be used; or fewer vehicle specific parameters may be determined. For example, vehicle specific parameters may be defined for adapting to specific road conditions during any of the driving phases. For example, a resistance to climbing an incline of a road segment on which the vehicle is traveling may be considered in the "constant driving" phase. A corresponding vehicle specific parameter may then be determined as dependent on the incline. In addition, the driving characteristics of the driver of the vehicle may also be considered. For example, the engine rotation speed at which the driver changes gears may be factored into the relationships used in selected driving phases.

In one example of an implementation, a vehicle specific efficiency parameter and the additional torque $M_{int}$ may be determined from acquired driving data. Equation (4) may be evaluated using a formula for numerical integration of zero-th order, to obtain, for each time increment j, the relationship:

$$b_j(t_j - t_{j-1}) = \frac{M_{int}}{\overline{\eta}_M \overline{\eta}_K H_u} n_j(t_j - t_{j-1}) + \frac{1}{\overline{\eta}_M \overline{\eta}_K H_u} n_j M_j(t_j - t_{j-1}) \quad (10)$$

where j=time increment
$n_j$=rotational speed at time increment j
$M_j$=torque at time increment j
$b_j$=fuel consumption at time increment j The current fuel consumption $b_j$, current rotational speed $n_j$, and torque $M_j$ applied by the engine may be obtained from the vehicle network 202. The vehicle specific parameters $x_1$ and $x_2$ may be defined as follow:

$$x_1 = M_{int}/\overline{\eta}_M \overline{\eta}_K H_u \quad (11)$$

$$x_2 = 1/\overline{\eta}_M \overline{\eta}_K H_u \quad (12)$$

The vehicle specific parameters $x_1$ and $x_2$ may be determined from a linear regression using a least mean squares method. It is noted that a negative fuel consumption may be obtained for a high deceleration of the vehicle. This result being impossible with conventional combustion engines, only positive values of the function $M(t)+M_{int}$ are used and negative function values are set to 0. In other types of motors such as, a hybrid drive or an electrical motor, a battery may be recharged allowing for the possibility of a valid negative fuel consumption.

Referring back to FIG. 4, at step 412, the determined vehicle specific parameters may be stored in memory in the navigation system 100 for use in various relationships, such as relationships for fuel consumption prediction and route determination. The acquired driving data may also be stored, and the vehicle specific parameters may be determined based on the stored driving data. A moving window approach may be used in which driving data acquired over a predetermined distance or a predetermined driving time is processed to determine the vehicle specific parameters. The acquired driving data may also be weighted. For example, more recently acquired data may be weighted higher. The driving data collected during a two hour drive on different types of roads may be sufficient to determine the vehicle specific parameters. The vehicle specific parameters may thus be determined in an adaptive manner allowing the navigation system 100 to be used in different vehicles. The precision of the determined parameters may also improve with increased driving time or driving distance.

Figure 5:
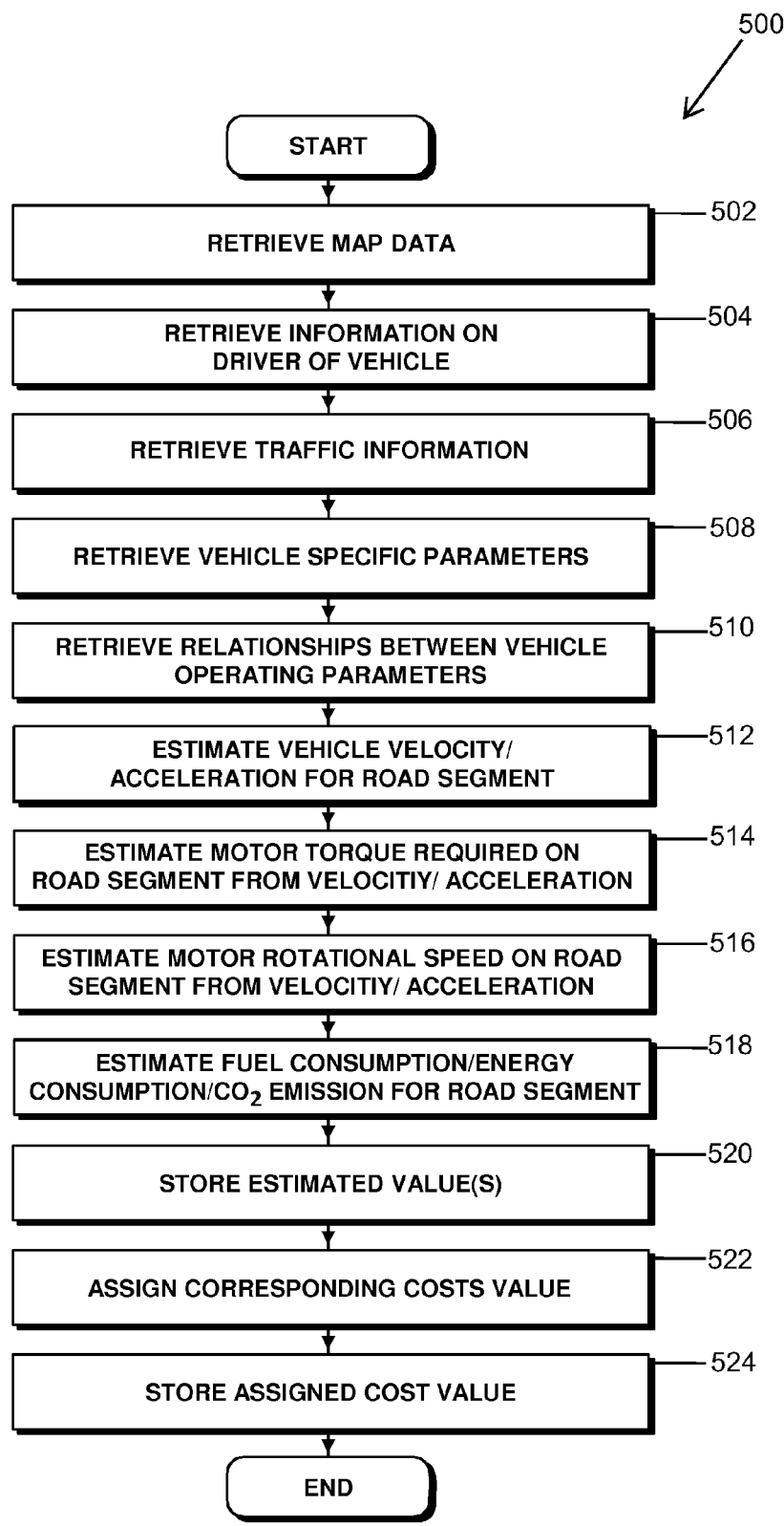
FIG. 5 is a flowchart illustrating operation of an example method for estimating a propulsion-related operating parameter.

FIG. 5 is a flowchart illustrating operation of an example method for estimating a propulsion-related operating parameter. The propulsion-related operating parameter of the vehicle may be estimated based on the determined vehicle specific parameters. At step 502, map data may be retrieved from memory 304 (in FIG. 3). At step 504, information relating to the driver of the vehicle may also be retrieved. The driver-related information may include a driver's preferred travelling velocity, information on how fast the driver accelerates the vehicle, and any other type of driver-related information that may be used for estimating a velocity profile for a given road segment. At step 506, traffic information may be retrieved from a traffic data source. Traffic information may be retrieved from a traffic data source such as a traffic message channel (TMC), TPEG (Transport Protocol Experts Group), VICS (Vehicle Information and Communication System) or other types of data sources. The traffic data may be retrieved using a mobile telephony network, floating car data or any other suitable infrastructure. The traffic information may be received for certain road segments included in the map data. For example, traffic information may be related to road segments within a predetermined distance from the current position of the vehicle.

At step 508, the vehicle specific parameters are retrieved or estimated. Predetermined vehicle specific parameters may be retrieved from memory. The vehicle specific parameters may also be estimated as described above. At step 510, relationships between the vehicle operating parameters are retrieved and used as described above to determine vehicle specific parameters and estimated operating parameters.

At step 512, a velocity profile for a road segment is estimated using available information. The velocity profile determined in step 512 is an approximation of the actual velocity profile that may be obtained when the vehicle is actually travelling on the road segment. The estimate of the velocity profile may for example consider the class of the road segment such as for example, whether it is a freeway, a highway or other type of road. The estimate may also consider the geometry of the road segment, such as for example, whether the road is straight or includes a plurality of curves. The velocity profile estimate may also factor in the traffic on the road segment and the individual driver characteristics. The estimate may also factor the presence of traffic lights on the road segment, which may lead to an additional deceleration and acceleration; and whether there is a speed limit for the road segment and other similar information. By considering these different types of information, the accuracy of the velocity profile may be improved. A velocity profile may be estimated for each individual road segment, such as for example, within a certain range. A velocity profile may also be estimated for different classes or types of road segments, which may result in reduced processing demands.

At step 514, the torque output of the motor of the vehicle may be estimated for the road segment using the velocity profile for the road segment. The torque may be estimated using of the relationships expressed above as Equations 6, 7 or 8. The estimated velocity profile may be divided into different driving phases as described above. The appropriate relationship for each driving phase and the determined vehicle specific parameters may then be used to determine an estimate of the torque. Similarly, the motor rotational speed may be estimated from the velocity profile for the road segment at step 516. The motor rotational speed may be estimated for different engaged gears using the relationship expressed in Equation 5.

At step 518, the vehicle specific parameters $x_1$ and $x_2$ expressed above in Equations 11 and 12 may be used to estimate the fuel consumption of the vehicle for the road segment according to the relationship expressed in Equation 4. The fuel consumption may for example be estimated for different time steps, and then integrated over the velocity profile. The determined propulsion-related operating parameter in the example in FIG. 5 is fuel consumption. However, in other examples, energy consumption for an electrical motor as an example, or a $CO_2$ emission may be estimated for the road segment.

The values estimated for the fuel consumption may then be stored at step 520. Corresponding cost values may then be assigned to the road segments or to the different road classes at step 522. A higher cost value may for example be determined for certain types of road segments in which there is higher fuel consumption. The cost values are then stored at step 524 and may, for example, be associated with the road segments or the different types of road segments. Cost values may for example be stored in non volatile memory, such as a hard drive or flash memory for direct access during a route calculation. Cost values may also be dynamically updated, such as for example, when traffic conditions change or when values of the determined vehicle specific parameters change.

It is to be understood that various implementations may perform more or fewer than the steps shown in FIG. 5. For example, the velocity profile may be estimated without making use of current traffic information. The estimated fuel consumption may also be directly assigned as a cost value to the road segment. The fuel consumption may also be calculated as an average over the road segment. In other examples, traffic information may be obtained from a static traffic model using historic statistical information on a traffic volume for certain day times, days, or periods of the year for different road segments.

Figure 6:
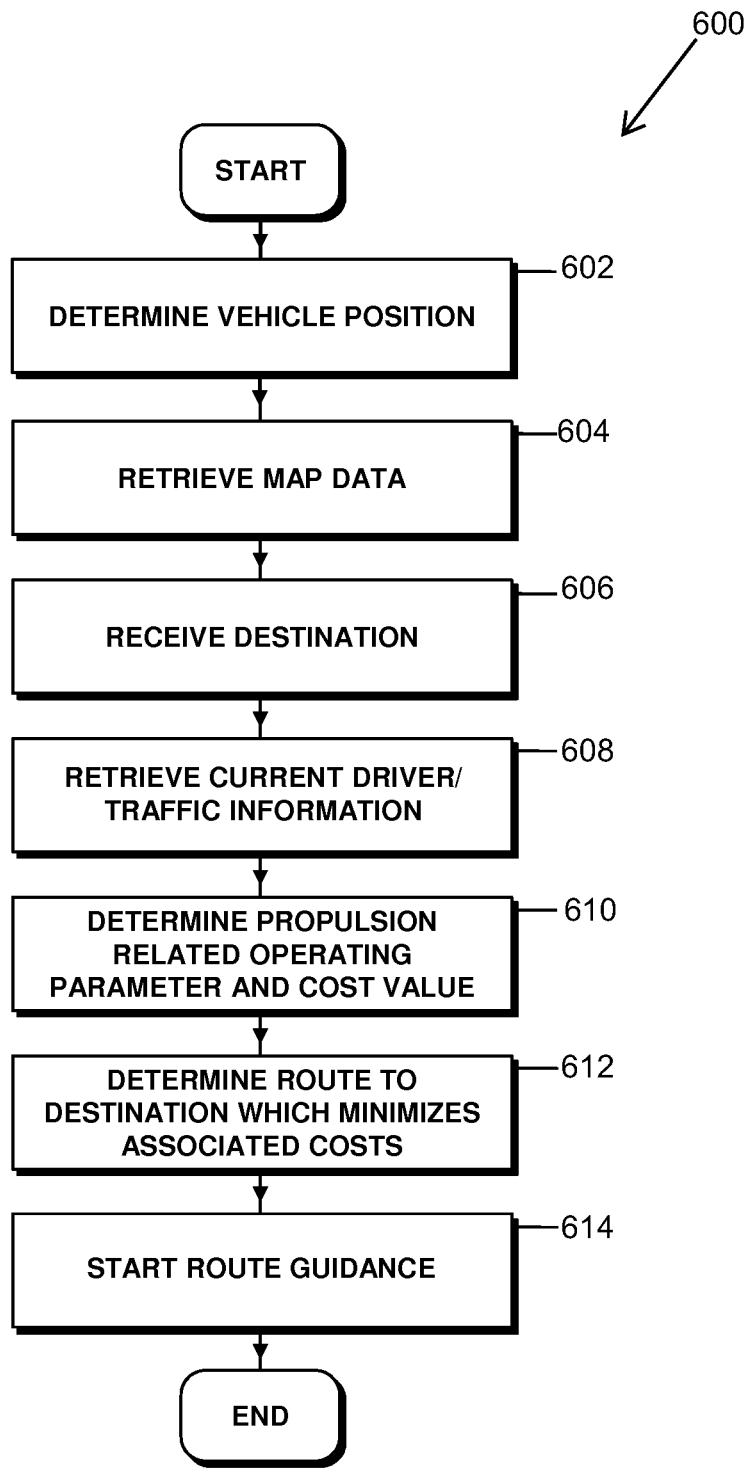
FIG. 6 is a flowchart illustrating operation of an example method for determining a route to a destination based on energy efficiency.

As described with reference to FIG. 6, the vehicle navigation system 100 may use the assigned cost values for a route determination. FIG. 6 is a flowchart illustrating operation of an example method for determining a route to a destination based on energy efficiency. At step 602, the current position of the vehicle is determined by a position sensor 216, which may be a GPS sensor. At step 604, map data is retrieved by the navigation system 100 from memory 304. At step 606, the driver enters a destination using the input device 310. At step 608, current driver/traffic information may be retrieved. At step 610, the propulsion-related operating parameter, such as for example, fuel consumption, and corresponding cost value is determined using for example, the method described with reference to FIG. 5. By retrieving current driver information, the fuel consumption for a certain route may be more accurate since the vehicle may be used by different drivers. The current driver may be determined by any suitable technique including by user input or any other technique for determining the identity of the driver of a vehicle. At step 610, the cost values may be retrieved from memory instead of by dynamic determination.

At step 612, the vehicle navigation system determines a route from the current position to the destination that minimizes the costs associated with the road segments of the route. The cost to be minimized may for example be determined by the driver. For example, the route determination may factor cost relating to fuel consumption as well as time, or distance, or any other cost criterion. Routes may thus be determined based on the most fuel efficient route, the most energy efficient route, the route leading to the least $CO_2$ emission, or routes that optimize a trade-off between various cost criteria. Route determination may be performed by any suitable technique, such as by a Viterbi search algorithm, an A* algorithm and other techniques. The algorithms used may be adapted for use with dynamic traffic information. The algorithm searches for the route for which the costs associated with the road segments of the route are minimized.

The navigation system 100 may determine one route, or a predetermined number of routes having the lowest total costs. The predetermined number of routes may be provided to the driver for selection. At step 614, the driver is guided along the selected route, which may be the most fuel efficient route thereby contributing to the reduction in operating costs for the vehicle and the pollution of the environment.

It will be understood, and is appreciated by persons skilled in the art, that one or more processes, sub-processes, or process steps described in connection with FIGS. 4-6 may be performed by hardware and/or software. If the process is performed by software, the software may reside in software memory (not shown) in a suitable electronic processing component or system such as, one or more of the functional components or modules schematically depicted in FIGS. 1-3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It is also to be understood that in the above description of various examples of implementations, any direct connection or coupling between functional blocks, devices, components, circuit elements or other physical or functional units shown in the drawings or described, such as any connection or coupling without intervening elements, may also be implemented by indirect connections or coupling, such as a connection or coupling with one or more additional intervening elements. It should be appreciated that the partitioning of components in functional blocks or units shown in the drawings is not to be construed as indicating that these units necessarily are implemented as physically separate units, but functional blocks or units shown or described may be implemented as separate units, circuits, chips or circuit elements, but one or more functional blocks or units may as well be implemented in a common circuit, chip, circuit element or unit.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method performed in general purpose computer of estimating a propulsion-related operating parameter of a vehicle for a road segment, the method comprising:
   estimating at least one operating parameter of the vehicle for the road segment based on information corresponding to the road segment;
   estimating the propulsion-related operating parameter for the road segment using the at least one estimated operating parameter and at least one vehicle specific parameter, where the at least one vehicle specific parameter is determined by:
   acquiring driving data to determine a plurality of vehicle operating parameters while the vehicle is in operation;
   using at least two of the determined vehicle operating parameters in a predetermined relationship that includes the at least one vehicle specific parameter; and
   determining the at least one vehicle specific parameter from the driving data for the at least two vehicle operating parameters and the relationship,
   identifying different driving phases in the driving data acquired for the plurality of vehicle operating parameters where at least one vehicle specific parameter is determined for driving phase, where each identified driving phase is associated with a set of vehicle specific parameters determined from the respective driving data, the vehicle specific parameters determined for the identified driving phases being used to estimate the propulsion related operating parameter.

2. The method of claim 1 where the propulsion-related operating parameter is a parameter selected from a group of parameters consisting of fuel consumption, energy consumption and carbon dioxide ($CO_2$) emission.

3. The method of claim 1 where the estimated operating parameter for the road segment is estimated as a function of time or distance with function values variable over the road segment.

4. The method of claim 1 where the estimated operating parameter is at least one of a velocity of the vehicle estimated for the road segment or an acceleration of the vehicle estimated for the road segment.

5. The method of claim 1 where the information provided for the road segment includes at least one of a road segment type, a road segment class, a maximum velocity allowed for the road segment, an average velocity determined for the type of road segment, a target velocity for the road segment, a form parameter for the road segment, an incline of the road segment, and current traffic information for the road segment.

6. The method of claim 1 where the step of estimating the at least one operating parameter includes using driving behaviour information determined for a driver of the vehicle.

7. The method of claim 1 where the predetermined relationship includes a relationship between predetermined vehicle operating parameters for each of a plurality of vehicle subsystem models, and where at least one vehicle specific parameter is determined for each subsystem model on the basis of the relationships, the determined vehicle specific parameters being used to estimate the propulsion-related operating parameter.

8. The method of claim 7 where the vehicle subsystem models include at least one of a model for a wheel to motor coupling, a model for slippage during up-/downshift, a model for a torque output of a motor of the vehicle, and a model for idling.

9. The method of claim 1 where the plurality of vehicle operating parameters for which driving data is acquired are selected from a group including velocity, acceleration, braking pressure, motor torque, motor rotation speed, gear engaged, fuel consumption, filling level of fuel tank, and driving status.

10. The method of claim 1 where the at least one vehicle specific parameter is proportional to a vehicle specific property selected from a group including a transmission ratio, a rolling drag coefficient, an aerodynamic drag coefficient, a resistance against acceleration coefficient, a braking resistance coefficient, a braking fraction of deceleration, a clutch operating speed coefficient, a fuel consumption when idling, a motor rotation speed when idling, a climbing resistance and an efficiency of a motor of the vehicle.

11. The method of claim 1 where the driving phases include at least one of an idling phase, an acceleration phase, a constant driving phase, a planar drive phase, a driving with deceleration phase, and a driving with applied brakes phase.

12. The method of claim 1 the step of determining the at least one vehicle specific parameter includes using a statistical parameter estimation procedure or a parameter optimization procedure.

13. The method of claim 1 where the step of estimating the propulsion-related operating parameter comprises:
   estimating a rotation speed of a motor of the vehicle for the road segment using the at least one estimated operating parameter, a first of the at least one vehicle specific parameter and a corresponding relationship;
   estimating a torque to be produced by the motor of the vehicle for the road segment using the at least one estimated operating parameter, a second one of the at least one vehicle specific parameter and a corresponding relationship; and
   estimating the propulsion-related operating parameter for the road segment from the estimated motor rotation speed, the estimated motor torque, a third one of the at least one vehicle specific parameter and a corresponding relationship.

14. The method of claim 1 where the at least one estimated operating parameter is the velocity of the vehicle, where the step of estimating the propulsion-related operating parameter includes:
  estimating a sum of driving resistances of the vehicle for the road segment using the velocity, at least a first of the at least one vehicle specific parameter and a corresponding relationship; and
  estimating the propulsion-related operating parameter for the road segment from the estimated velocity, the estimated driving resistances, a second of the at least one vehicle specific parameter and a corresponding relationship.

15. The method of claim 1 further comprising:
  assigning a cost value corresponding to the estimated propulsion-related operating parameter to the road segment or to a class or type of the road segment, the cost value being provided for a further route calculation.

16. A navigation system for a vehicle comprising:
  an interface unit providing an interface to a vehicle sensor system;
  a processing unit configured to estimate a propulsion-related operating parameter of the vehicle for a road segment by estimating at least one operating parameter of the vehicle for the road segment based on information provided for the road segment and estimating the propulsion-related operating parameter for the road segment on the basis of the at least one estimated operating parameter and using at least one vehicle specific parameter;
  the processing unit being further configured to determine the at least one vehicle specific parameter by:
    acquiring driving data to determine a plurality of vehicle operating parameters while the vehicle is in operation;
    using at least two of the determined vehicle operating parameters in a predetermined relationship that includes the at least one vehicle specific parameter; and
    determining the at least one vehicle specific parameter from the driving data for the at least two vehicle operating parameters and the relationship.

17. The navigation system of claim 16 further comprising a database configured to store the at least on vehicle specific parameter determined by the processing unit.

18. A non-transitory computer readable medium with an executable program stored in the medium, where the program performs the following steps when executed:
  estimating at least one operating parameter of the vehicle for the road segment based on information corresponding to the road segment;
  estimating a propulsion-related operating parameter for the road segment using the at least one estimated operating parameter and at least one vehicle specific parameter, where the at least one vehicle specific parameter is determined by:
    acquiring driving data to determine a plurality of vehicle operating parameters while the vehicle is in operation;
    using at least two of the determined vehicle operating parameters in a predetermined relationship that includes the at least one vehicle specific parameter; and
    determining the at least one vehicle specific parameter from the driving data for the at least two vehicle operating parameters and the relationship.

* * * * *